US010748022B1

(12) United States Patent
Raichelgauz et al.

(10) Patent No.: US 10,748,022 B1
(45) Date of Patent: Aug. 18, 2020

(54) CROWD SEPARATION

(71) Applicant: CARTICA AI LTD, Tel Aviv (IL)

(72) Inventors: Igal Raichelgauz, Tel Aviv (IL); Kirill Dyagilev, Jersey City, NJ (US); Karina Odinaev, Tel Aviv (IL)

(73) Assignee: CARTICA AI LTD, Tel Aviv (IL)

( * ) Notice: Subject to any disclaimer, the term of this patent is extended or adjusted under 35 U.S.C. 154(b) by 0 days.

(21) Appl. No.: 16/711,474

(22) Filed: Dec. 12, 2019

(51) Int. Cl.
*G06K 9/00* (2006.01)
*G06K 9/20* (2006.01)
*G06T 7/11* (2017.01)
*G06T 7/73* (2017.01)

(52) U.S. Cl.
CPC ....... *G06K 9/2054* (2013.01); *G06K 9/00362* (2013.01); *G06T 7/11* (2017.01); *G06T 7/74* (2017.01); *G06T 2207/20081* (2013.01); *G06T 2207/20084* (2013.01); *G06T 2207/30196* (2013.01)

(58) Field of Classification Search
None
See application file for complete search history.

(56) References Cited

U.S. PATENT DOCUMENTS

| | | |
|---|---|---|
| 4,733,353 A | 3/1988 | Jaswa |
| 4,932,645 A | 6/1990 | Schorey et al. |
| 4,972,363 A | 11/1990 | Nguyen et al. |
| 5,078,501 A | 1/1992 | Hekker et al. |
| 5,194,008 A * | 3/1993 | Mohan .................. F41G 3/2638 434/22 |
| 5,214,746 A | 5/1993 | Fogel et al. |

(Continued)

FOREIGN PATENT DOCUMENTS

| | | |
|---|---|---|
| EP | 1085464 A3 | 1/2007 |
| WO | 0231764 A2 | 4/2002 |

(Continued)

OTHER PUBLICATIONS

Lin et al., "Summarization of Large Scale Social Network Activity", DOI: 10.1109/ICASSP.2009.4960375, Apr. 2009, pp. 3481-3484.

(Continued)

*Primary Examiner* — Shervin K Nakhjavan
(74) *Attorney, Agent, or Firm* — Reches Patent

(57) ABSTRACT

A method for crowd separation, the method may include receiving or generating a signature of an image of a first plurality of pedestrians, wherein the image comprises regions, wherein the signature of the image comprises descriptors of the regions, wherein each descriptor of a region is associated with a region and comprises a set of identifiers that identify content included in the region and in a vicinity of the region; detecting, within the descriptors of the regions, unique combinations of identifiers that are indicative of spatial relationships between the regions and bounding boxes that surround pedestrians of the first plurality of pedestrians; wherein the unique combinations are learnt during a supervised machine learning process that is fed with test images of densely positioned pedestrians; and locating the pedestrians of the first plurality of pedestrians based, at least in part, on the spatial relationships related to detected unique combinations and to locations of the regions.

20 Claims, 8 Drawing Sheets

(56) References Cited

U.S. PATENT DOCUMENTS

| | | |
|---|---|---|
| 5,307,451 A | 4/1994 | Clark |
| 5,412,564 A | 5/1995 | Ecer |
| 5,436,653 A | 7/1995 | Ellis et al. |
| 5,568,181 A | 10/1996 | Greenwood et al. |
| 5,638,425 A | 6/1997 | Meador et al. |
| 5,745,678 A | 4/1998 | Herzberg et al. |
| 5,754,938 A | 5/1998 | Herz et al. |
| 5,763,069 A | 6/1998 | Jordan |
| 5,806,061 A | 9/1998 | Chaudhuri et al. |
| 5,835,087 A | 11/1998 | Herz et al. |
| 5,835,901 A | 11/1998 | Duvoisin et al. |
| 5,852,435 A | 12/1998 | Vigneaux et al. |
| 5,870,754 A | 2/1999 | Dimitrova et al. |
| 5,873,080 A | 2/1999 | Coden et al. |
| 5,887,193 A | 3/1999 | Takahashi et al. |
| 5,926,812 A | 7/1999 | Hilsenrath et al. |
| 5,978,754 A | 11/1999 | Kumano |
| 5,991,306 A | 11/1999 | Burns et al. |
| 6,052,481 A | 4/2000 | Grajski et al. |
| 6,070,167 A | 5/2000 | Qian et al. |
| 6,076,088 A | 6/2000 | Paik et al. |
| 6,122,628 A | 9/2000 | Castelli et al. |
| 6,128,651 A | 10/2000 | Cezar |
| 6,137,911 A | 10/2000 | Zhilyaev |
| 6,144,767 A | 11/2000 | Bottou et al. |
| 6,147,636 A | 11/2000 | Gershenson |
| 6,163,510 A | 12/2000 | Lee et al. |
| 6,243,375 B1 | 6/2001 | Speicher |
| 6,243,713 B1 | 6/2001 | Nelson et al. |
| 6,275,599 B1 | 8/2001 | Adler et al. |
| 6,314,419 B1 | 11/2001 | Faisal |
| 6,329,986 B1 | 12/2001 | Cheng |
| 6,381,656 B1 | 4/2002 | Shankman |
| 6,411,229 B2 | 6/2002 | Kobayashi |
| 6,422,617 B1 | 7/2002 | Fukumoto et al. |
| 6,507,672 B1 | 1/2003 | Watkins et al. |
| 6,523,046 B2 | 2/2003 | Liu et al. |
| 6,524,861 B1 | 2/2003 | Anderson |
| 6,546,405 B2 | 4/2003 | Gupta et al. |
| 6,550,018 B1 | 4/2003 | Abonamah et al. |
| 6,557,042 B1 | 4/2003 | He et al. |
| 6,594,699 B1 | 7/2003 | Sahai et al. |
| 6,601,026 B2 | 7/2003 | Appelt et al. |
| 6,611,628 B1 | 8/2003 | Sekiguchi et al. |
| 6,618,711 B1 | 9/2003 | Ananth |
| 6,643,620 B1 | 11/2003 | Contolini et al. |
| 6,643,643 B1 | 11/2003 | Lee et al. |
| 6,665,657 B1 | 12/2003 | Dibachi |
| 6,681,032 B2 | 1/2004 | Bortolussi et al. |
| 6,704,725 B1 | 3/2004 | Lee |
| 6,732,149 B1 | 5/2004 | Kephart |
| 6,742,094 B2 | 5/2004 | Igari |
| 6,751,363 B1 | 6/2004 | Natsev et al. |
| 6,751,613 B1 | 6/2004 | Lee et al. |
| 6,754,435 B2 | 6/2004 | Kim |
| 6,763,069 B1 | 7/2004 | Divakaran et al. |
| 6,763,519 B1 | 7/2004 | McColl et al. |
| 6,774,917 B1 | 8/2004 | Foote et al. |
| 6,795,818 B1 | 9/2004 | Lee |
| 6,804,356 B1 | 10/2004 | Krishnamachari |
| 6,813,395 B1 | 11/2004 | Kinjo |
| 6,819,797 B1 | 11/2004 | Smith et al. |
| 6,877,134 B1 | 4/2005 | Fuller et al. |
| 6,901,207 B1 | 5/2005 | Watkins |
| 6,938,025 B1 | 8/2005 | Lulich et al. |
| 6,985,172 B1 | 1/2006 | Rigney et al. |
| 7,013,051 B2 | 3/2006 | Sekiguchi et al. |
| 7,020,654 B1 | 3/2006 | Najmi |
| 7,023,979 B1 | 4/2006 | Wu et al. |
| 7,043,473 B1 | 5/2006 | Rassool et al. |
| 7,158,681 B2 | 1/2007 | Persiantsev |
| 7,215,828 B2 | 5/2007 | Luo |
| 7,260,564 B1 | 8/2007 | Lynn et al. |
| 7,289,643 B2 | 10/2007 | Brunk et al. |
| 7,299,261 B1 | 11/2007 | Oliver et al. |
| 7,302,089 B1 | 11/2007 | Smits |
| 7,302,117 B2 | 11/2007 | Sekiguchi et al. |
| 7,313,805 B1 | 12/2007 | Rosin et al. |
| 7,340,358 B2 | 3/2008 | Yoneyama |
| 7,346,629 B2 | 3/2008 | Kapur et al. |
| 7,353,224 B2 | 4/2008 | Chen et al. |
| 7,376,672 B2 | 5/2008 | Weare |
| 7,383,179 B2 | 6/2008 | Alves et al. |
| 7,433,895 B2 | 10/2008 | Li et al. |
| 7,464,086 B2 | 12/2008 | Black et al. |
| 7,529,659 B2 | 5/2009 | Wold |
| 7,657,100 B2 | 2/2010 | Gokturk et al. |
| 7,660,468 B2 | 2/2010 | Gokturk et al. |
| 7,805,446 B2 | 9/2010 | Potok et al. |
| 7,860,895 B1 | 12/2010 | Scofield et al. |
| 7,872,669 B2 | 1/2011 | Darrell et al. |
| 7,921,288 B1 | 4/2011 | Hildebrand |
| 7,933,407 B2 | 4/2011 | Keidar et al. |
| 8,023,739 B2 | 9/2011 | Hohimer et al. |
| 8,266,185 B2 | 9/2012 | Raichelgauz et al. |
| 8,285,718 B1 | 10/2012 | Ong et al. |
| 8,312,031 B2 | 11/2012 | Raichelgauz et al. |
| 8,315,442 B2 | 11/2012 | Gokturk et al. |
| 8,345,982 B2 | 1/2013 | Gokturk et al. |
| 8,386,400 B2 | 2/2013 | Raichelgauz et al. |
| 8,396,876 B2 | 3/2013 | Kennedy et al. |
| 8,418,206 B2 | 4/2013 | Bryant et al. |
| 8,442,321 B1 | 5/2013 | Chang et al. |
| 8,457,827 B1 | 6/2013 | Ferguson et al. |
| 8,495,489 B1 | 7/2013 | Everingham |
| 8,635,531 B2 | 1/2014 | Graham et al. |
| 8,655,801 B2 | 2/2014 | Raichelgauz et al. |
| 8,655,878 B1 | 2/2014 | Kulkarni et al. |
| 8,799,195 B2 | 8/2014 | Raichelgauz et al. |
| 8,799,196 B2 | 8/2014 | Raichelquaz et al. |
| 8,818,916 B2 | 8/2014 | Raichelgauz et al. |
| 8,868,861 B2 | 10/2014 | Shimizu et al. |
| 8,886,648 B1 | 11/2014 | Procopio et al. |
| 8,954,887 B1 | 2/2015 | Tseng et al. |
| 8,990,199 B1 | 3/2015 | Ramesh et al. |
| 9,009,086 B2 | 4/2015 | Raichelgauz et al. |
| 9,104,747 B2 | 8/2015 | Raichelgauz et al. |
| 9,165,406 B1 | 10/2015 | Gray et al. |
| 9,311,308 B2 | 4/2016 | Sankarasubramaniam et al. |
| 9,323,754 B2 | 4/2016 | Ramanathan et al. |
| 9,466,068 B2 | 10/2016 | Raichelgauz et al. |
| 9,646,006 B2 | 5/2017 | Raichelgauz et al. |
| 9,679,062 B2 | 6/2017 | Schillings et al. |
| 9,807,442 B2 | 10/2017 | Bhatia et al. |
| 9,875,445 B2 | 1/2018 | Amer et al. |
| 9,984,369 B2 | 5/2018 | Li et al. |
| 2001/0019633 A1 | 9/2001 | Tenze et al. |
| 2001/0034219 A1 | 10/2001 | Hewitt et al. |
| 2001/0038876 A1 | 11/2001 | Anderson |
| 2002/0004743 A1 | 1/2002 | Kutaragi et al. |
| 2002/0010682 A1 | 1/2002 | Johnson |
| 2002/0010715 A1 | 1/2002 | Chinn et al. |
| 2002/0019881 A1 | 2/2002 | Bokhari et al. |
| 2002/0032677 A1 | 3/2002 | Morgenthaler et al. |
| 2002/0038299 A1 | 3/2002 | Zernik et al. |
| 2002/0042914 A1 | 4/2002 | Walker et al. |
| 2002/0072935 A1 | 6/2002 | Rowse et al. |
| 2002/0087530 A1 | 7/2002 | Smith et al. |
| 2002/0087828 A1 | 7/2002 | Arimilli et al. |
| 2002/0091947 A1 | 7/2002 | Nakamura |
| 2002/0107827 A1 | 8/2002 | Benitez-Jimenez et al. |
| 2002/0113812 A1 | 8/2002 | Walker et al. |
| 2002/0126002 A1 | 9/2002 | Patchell |
| 2002/0126872 A1 | 9/2002 | Brunk et al. |
| 2002/0129140 A1 | 9/2002 | Peled et al. |
| 2002/0147637 A1 | 10/2002 | Kraft et al. |
| 2002/0157116 A1 | 10/2002 | Jasinschi |
| 2002/0163532 A1 | 11/2002 | Thomas et al. |
| 2002/0174095 A1 | 11/2002 | Lulich et al. |
| 2002/0184505 A1 | 12/2002 | Mihcak et al. |
| 2003/0004966 A1 | 1/2003 | Bolle et al. |
| 2003/0005432 A1 | 1/2003 | Ellis et al. |
| 2003/0037010 A1 | 2/2003 | Schmelzer |
| 2003/0041047 A1 | 2/2003 | Chang et al. |

(56) References Cited

U.S. PATENT DOCUMENTS

| | | |
|---|---|---|
| 2003/0089216 A1 | 5/2003 | Birmingham et al. |
| 2003/0093790 A1 | 5/2003 | Logan et al. |
| 2003/0101150 A1 | 5/2003 | Agnihotri et al. |
| 2003/0105739 A1 | 6/2003 | Essafi et al. |
| 2003/0110236 A1 | 6/2003 | Yang et al. |
| 2003/0115191 A1 | 6/2003 | Copperman et al. |
| 2003/0126147 A1 | 7/2003 | Essafi et al. |
| 2003/0140257 A1 | 7/2003 | Peterka et al. |
| 2003/0165269 A1 | 9/2003 | Fedorovskaya et al. |
| 2003/0174859 A1 | 9/2003 | Kim |
| 2003/0184598 A1 | 10/2003 | Graham |
| 2003/0200217 A1 | 10/2003 | Ackerman |
| 2003/0217335 A1 | 11/2003 | Chung et al. |
| 2003/0229531 A1 | 12/2003 | Beckerman et al. |
| 2004/0095376 A1 | 5/2004 | Graham et al. |
| 2004/0098671 A1 | 5/2004 | Graham et al. |
| 2004/0111432 A1 | 6/2004 | Adams et al. |
| 2004/0117638 A1 | 6/2004 | Monroe |
| 2004/0128511 A1 | 7/2004 | Sun et al. |
| 2004/0153426 A1 | 8/2004 | Nugent |
| 2004/0162820 A1 | 8/2004 | James et al. |
| 2004/0267774 A1 | 12/2004 | Lin et al. |
| 2005/0021394 A1 | 1/2005 | Miedema et al. |
| 2005/0080788 A1 | 4/2005 | Murata |
| 2005/0114198 A1 | 5/2005 | Koningstein et al. |
| 2005/0131884 A1 | 6/2005 | Gross et al. |
| 2005/0163375 A1 | 7/2005 | Grady |
| 2005/0172130 A1 | 8/2005 | Roberts |
| 2005/0177372 A1 | 8/2005 | Wang et al. |
| 2005/0226511 A1 | 10/2005 | Short |
| 2005/0238198 A1 | 10/2005 | Brown et al. |
| 2005/0238238 A1 | 10/2005 | Ku et al. |
| 2005/0249398 A1 | 11/2005 | Khamene et al. |
| 2005/0256820 A1 | 11/2005 | Dugan et al. |
| 2005/0262428 A1 | 11/2005 | Little et al. |
| 2005/0281439 A1 | 12/2005 | Lange |
| 2005/0289163 A1 | 12/2005 | Gordon et al. |
| 2005/0289590 A1 | 12/2005 | Cheok et al. |
| 2006/0004745 A1 | 1/2006 | Kuhn et al. |
| 2006/0015580 A1 | 1/2006 | Gabriel et al. |
| 2006/0020958 A1 | 1/2006 | Allamanche et al. |
| 2006/0033163 A1 | 2/2006 | Chen |
| 2006/0050993 A1 | 3/2006 | Stentiford |
| 2006/0069668 A1 | 3/2006 | Braddy et al. |
| 2006/0080311 A1 | 4/2006 | Potok et al. |
| 2006/0112035 A1 | 5/2006 | Cecchi et al. |
| 2006/0129822 A1 | 6/2006 | Snijder et al. |
| 2006/0217818 A1 | 9/2006 | Fujiwara |
| 2006/0217828 A1 | 9/2006 | Hicken |
| 2006/0218191 A1 | 9/2006 | Gopalakrishnan |
| 2006/0224529 A1 | 10/2006 | Kermani |
| 2006/0236343 A1 | 10/2006 | Chang |
| 2006/0242130 A1 | 10/2006 | Sadri et al. |
| 2006/0248558 A1 | 11/2006 | Barton et al. |
| 2006/0251338 A1 | 11/2006 | Gokturk et al. |
| 2006/0253423 A1 | 11/2006 | McLane et al. |
| 2006/0288002 A1 | 12/2006 | Epstein et al. |
| 2007/0022374 A1 | 1/2007 | Huang et al. |
| 2007/0033170 A1 | 2/2007 | Sull et al. |
| 2007/0038614 A1 | 2/2007 | Guha |
| 2007/0042757 A1 | 2/2007 | Jung et al. |
| 2007/0061302 A1 | 3/2007 | Ramer et al. |
| 2007/0067304 A1 | 3/2007 | Ives |
| 2007/0074147 A1 | 3/2007 | Wold |
| 2007/0083611 A1 | 4/2007 | Farago et al. |
| 2007/0091106 A1 | 4/2007 | Moroney |
| 2007/0130159 A1 | 6/2007 | Gulli et al. |
| 2007/0136782 A1 | 6/2007 | Ramaswamy et al. |
| 2007/0156720 A1 | 7/2007 | Maren |
| 2007/0244902 A1 | 10/2007 | Seide et al. |
| 2007/0253594 A1 | 11/2007 | Lu et al. |
| 2007/0298152 A1 | 12/2007 | Baets |
| 2008/0049789 A1 | 2/2008 | Vedantham et al. |
| 2008/0072256 A1 | 3/2008 | Boicey et al. |
| 2008/0079729 A1 | 4/2008 | Brailovsky |
| 2008/0152231 A1 | 6/2008 | Gokturk et al. |
| 2008/0159622 A1 | 7/2008 | Agnihotri et al. |
| 2008/0165861 A1 | 7/2008 | Wen et al. |
| 2008/0201299 A1 | 8/2008 | Lehikoinen et al. |
| 2008/0201314 A1 | 8/2008 | Smith et al. |
| 2008/0201361 A1 | 8/2008 | Castro et al. |
| 2008/0228995 A1 | 9/2008 | Tan et al. |
| 2008/0237359 A1 | 10/2008 | Silverbrook et al. |
| 2008/0247543 A1 | 10/2008 | Mick et al. |
| 2008/0253737 A1 | 10/2008 | Kimura et al. |
| 2008/0263579 A1 | 10/2008 | Mears et al. |
| 2008/0270373 A1 | 10/2008 | Dostveen et al. |
| 2008/0294278 A1 | 11/2008 | Borgeson et al. |
| 2008/0307454 A1 | 12/2008 | Ahanger et al. |
| 2008/0313140 A1 | 12/2008 | Pereira et al. |
| 2009/0024641 A1 | 1/2009 | Quigley et al. |
| 2009/0037088 A1 | 2/2009 | Taguchi |
| 2009/0043637 A1 | 2/2009 | Eder |
| 2009/0096634 A1 | 4/2009 | Emam et al. |
| 2009/0116749 A1* | 5/2009 | Cristinacce ......... G06K 9/00281 382/195 |
| 2009/0125544 A1 | 5/2009 | Brindley |
| 2009/0157575 A1 | 6/2009 | Schobben et al. |
| 2009/0165031 A1 | 6/2009 | Li et al. |
| 2009/0172030 A1 | 7/2009 | Schiff et al. |
| 2009/0208106 A1 | 8/2009 | Dunlop et al. |
| 2009/0208118 A1 | 8/2009 | Csurka |
| 2009/0216761 A1 | 8/2009 | Raichelgauz et al. |
| 2009/0220138 A1 | 9/2009 | Zhang et al. |
| 2009/0245573 A1 | 10/2009 | Saptharishi et al. |
| 2009/0254572 A1 | 10/2009 | Redlich et al. |
| 2009/0282218 A1 | 11/2009 | Raichelgauz et al. |
| 2009/0297048 A1 | 12/2009 | Slotine et al. |
| 2010/0042646 A1 | 2/2010 | Raichelgauz et al. |
| 2010/0082684 A1 | 4/2010 | Churchill et al. |
| 2010/0104184 A1 | 4/2010 | Bronstein et al. |
| 2010/0125569 A1 | 5/2010 | Nair et al. |
| 2010/0162405 A1 | 6/2010 | Cook et al. |
| 2010/0191391 A1* | 7/2010 | Zeng ......... G08G 1/165 701/1 |
| 2010/0198626 A1 | 8/2010 | Cho et al. |
| 2010/0212015 A1 | 8/2010 | Jin et al. |
| 2010/0284604 A1 | 11/2010 | Chrysanthakopoulos |
| 2010/0293057 A1 | 11/2010 | Haveliwala et al. |
| 2010/0312736 A1 | 12/2010 | Kello |
| 2010/0318493 A1 | 12/2010 | Wessling |
| 2010/0325138 A1 | 12/2010 | Lee et al. |
| 2010/0325581 A1 | 12/2010 | Finkelstein et al. |
| 2011/0035373 A1 | 2/2011 | Berg et al. |
| 2011/0055585 A1 | 3/2011 | Lee |
| 2011/0164180 A1 | 7/2011 | Lee |
| 2011/0164810 A1 | 7/2011 | Zang et al. |
| 2011/0216209 A1 | 9/2011 | Fredlund et al. |
| 2011/0218946 A1 | 9/2011 | Stern et al. |
| 2011/0276680 A1 | 11/2011 | Rimon |
| 2011/0296315 A1 | 12/2011 | Lin et al. |
| 2012/0131454 A1 | 5/2012 | Shah |
| 2012/0136853 A1 | 5/2012 | Kennedy et al. |
| 2012/0167133 A1 | 6/2012 | Carroll et al. |
| 2012/0179642 A1 | 7/2012 | Sweeney et al. |
| 2012/0185445 A1 | 7/2012 | Borden et al. |
| 2012/0207346 A1* | 8/2012 | Kohli ......... G06K 9/00369 382/103 |
| 2012/0221470 A1 | 8/2012 | Lyon |
| 2012/0227074 A1 | 9/2012 | Hill et al. |
| 2012/0239690 A1 | 9/2012 | Asikainen et al. |
| 2012/0239694 A1 | 9/2012 | Avner et al. |
| 2012/0265735 A1 | 10/2012 | McMillan et al. |
| 2012/0294514 A1 | 11/2012 | Saunders et al. |
| 2012/0299961 A1 | 11/2012 | Ramkumar et al. |
| 2012/0301105 A1 | 11/2012 | Rehg et al. |
| 2012/0331011 A1 | 12/2012 | Raichelgauz et al. |
| 2013/0043990 A1 | 2/2013 | Al-Jafar |
| 2013/0066856 A1 | 3/2013 | Ong et al. |
| 2013/0067364 A1 | 3/2013 | Berntson et al. |
| 2013/0086499 A1 | 4/2013 | Dyor et al. |
| 2013/0089248 A1 | 4/2013 | Remiszewski et al. |
| 2013/0129199 A1* | 5/2013 | Russakovsky ......... G06K 9/62 382/159 |

(56) References Cited

U.S. PATENT DOCUMENTS

| | | |
|---|---|---|
| 2013/0151522 A1 | 6/2013 | Aggarwal et al. |
| 2013/0159298 A1 | 6/2013 | Mason et al. |
| 2013/0226930 A1 | 8/2013 | Amgren et al. |
| 2013/0227023 A1 | 8/2013 | Raichelgauz et al. |
| 2013/0283401 A1 | 10/2013 | Pabla et al. |
| 2013/0346412 A1 | 12/2013 | Raichelgauz et al. |
| 2014/0019264 A1 | 1/2014 | Ivachman et al. |
| 2014/0025692 A1 | 1/2014 | Pappas |
| 2014/0125703 A1 | 5/2014 | Roveta et al. |
| 2014/0147829 A1 | 5/2014 | Jerauld |
| 2014/0149918 A1 | 5/2014 | Asokan et al. |
| 2014/0152698 A1 | 6/2014 | Kim et al. |
| 2014/0156691 A1 | 6/2014 | Conwell |
| 2014/0169681 A1 | 6/2014 | Drake |
| 2014/0176604 A1 | 6/2014 | Venkitaraman et al. |
| 2014/0193077 A1 | 7/2014 | Shiiyama et al. |
| 2014/0198986 A1 | 7/2014 | Marchesotti |
| 2014/0201330 A1 | 7/2014 | Lopez et al. |
| 2014/0250032 A1 | 9/2014 | Huang et al. |
| 2014/0282655 A1 | 9/2014 | Roberts |
| 2014/0300722 A1 | 10/2014 | Garcia |
| 2014/0330830 A1 | 11/2014 | Raichelgauz et al. |
| 2014/0341476 A1 | 11/2014 | Kulick et al. |
| 2014/0363044 A1 | 12/2014 | Williams et al. |
| 2015/0052089 A1 | 2/2015 | Kozloski et al. |
| 2015/0100562 A1 | 4/2015 | Kohlmeier et al. |
| 2015/0117784 A1 | 4/2015 | Lin et al. |
| 2015/0120627 A1 | 4/2015 | Hunzinger et al. |
| 2015/0127516 A1 | 5/2015 | Studnitzer et al. |
| 2015/0248586 A1* | 9/2015 | Gaidon .............. G06K 9/00711 382/103 |
| 2015/0254344 A1 | 9/2015 | Kulkarni et al. |
| 2015/0286742 A1 | 10/2015 | Zhang et al. |
| 2015/0286872 A1* | 10/2015 | Medioni .................... G06T 7/20 382/103 |
| 2015/0324356 A1 | 11/2015 | Gutierrez et al. |
| 2015/0332588 A1* | 11/2015 | Bulan .................. G08G 1/0175 348/149 |
| 2016/0007083 A1 | 1/2016 | Gurha |
| 2016/0026707 A1 | 1/2016 | Ong et al. |
| 2016/0132194 A1 | 5/2016 | Grue et al. |
| 2016/0221592 A1 | 8/2016 | Puttagunta et al. |
| 2016/0275766 A1* | 9/2016 | Venetianer ......... G06K 9/00771 |
| 2016/0306798 A1 | 10/2016 | Guo et al. |
| 2017/0017638 A1 | 1/2017 | Satyavarta et al. |
| 2017/0154241 A1 | 6/2017 | Shambik et al. |
| 2018/0108258 A1 | 4/2018 | Dilger |
| 2018/0157903 A1* | 6/2018 | Tu ........................ G06K 9/0061 |
| 2018/0189613 A1 | 7/2018 | Wolf et al. |
| 2018/0373929 A1* | 12/2018 | Ye ........................ G06K 9/4642 |
| 2019/0096135 A1* | 3/2019 | Dal Mutto ............ G06T 7/0006 |
| 2019/0171912 A1* | 6/2019 | Vallespi-Gonzalez ....................... G06K 9/6268 |
| 2019/0279046 A1 | 9/2019 | Han et al. |
| 2019/0286932 A1* | 9/2019 | Du ....................... G06K 9/2054 |
| 2019/0304102 A1 | 10/2019 | Chen et al. |

FOREIGN PATENT DOCUMENTS

| | | |
|---|---|---|
| WO | 2003067467 A1 | 8/2003 |
| WO | 2005027457 A1 | 3/2005 |
| WO | 2007049282 A2 | 5/2007 |
| WO | 2014076002 A1 | 5/2014 |
| WO | 2014137337 A1 | 9/2014 |
| WO | 2016040376 A1 | 3/2016 |
| WO | 2016070193 A1 | 5/2016 |

OTHER PUBLICATIONS

Santos et al., "SCORM-MPEG: an ontology of interoperable metadata for Multimedia and e-Learning", DOI: 10.1109/SOFTCOM.2015. 7314122, Nov. 2, 2015, pp. 5.

Scheper et al., "Nonlinear dynamics in neural computation", ESANN, 14th European Symposium on Artificial Neural Networks, Jan. 2006, pp. 491-502.

Schneider et al., "A Robust Content Based Digital Signature for Image Authentication", 3rd IEEE International Conference on Image Processing, Sep. 19, 2006, pp. 227-230.

Semizarov et al.,"Specificity of short interfering RNA determined through gene expression signatures", PNAS vol. 100 (11), May 27, 2003, pp. 6347-6352.

Sheng Hua et al., "Robust video signature based on ordinal measure", ICIP '04. 2004 International Conference on Image Processing, Oct. 2004, pp. 685-688.

Stolberg et al., "HiBRID-SoC: A multi-core SoC architecture for multimedia signal processing. VLSI Signal Processing", Journal of VLSI Signal Processing vol. 41(1), Aug. 2005, pp. 9-20.

Theodoropoulos et al., "Simulating asynchronous architectures on transputer networks", 4th Euromicro Workshop on Parallel and Distributed Processing, Braga, Portugal, 1996, pp. 274-281.

Vailaya et al., "Content-Based Hierarchical Classification of Vacation Images", International Conference on Multimedia Computing and Systems, vol. 1, DOI—10.1109/MMCS.1999.779255, Jul. 1999, pp. 518-523.

Verstraeten et al., "Isolated word recognition with the Liquid State Machine: A case study", Information Processing Letters, vol. 95(6), Sep. 2005, pp. 521-528.

Vallet et al.,"Personalized Content Retrieval in Context Using Ontological Knowledge", in IEEE Transactions on Circuits and Systems for Video Technology, vol. 17, No. 3, Mar. 2007, pp. 336-346.

Wang et al., "Classifying objectionable websites based on image content" Interactive Distributed Multimedia Systems and Telecommunication Services, vol. 1483, 1998, pp. 113-124.

Wang et al., "A Signature for Content-Based Image Retrieval Using a Geometrical Transform", 6th ACM International Conference on Multimedia, Multimedia 1998, pp. 229-234.

Ware et al., "Locating and identifying components in a robot's workspace using a hybrid computer architecture", 10th International Symposium on Intelligent Control, 1995, pp. 139-144.

Li et al. "Exploring Visual and Motion Saliency for Automatic Video Object Extraction", in IEEE Transactions on Image Processing, vol. 22, No. 7, Jul. 2013, pp. 2600-2610.

Colin Whitby-Strevens, "The transputer", 12th annual international symposium on Computer architecture (ISCA), IEEE Computer Society Press, Jun. 1985, pp. 292-300.

Wilk et al., "The potential of social-aware multimedia prefetching on mobile devices", International Conference and Workshops on Networked Systems (NetSys 2015) Mar. 2015, p. 1.

Andrew William Hogue, "Tree pattern inference and matching for wrapper induction on the World Wide Web", May 13, 2014, pp. 106.

Liu et al. "Instant Mobile Video Search With Layered Audio-Video Indexing and Progressive Transmission", IEEE Transactions on Multimedia 16(Dec. 8, 2014, pp. 2242-2255.

Raichelgauz et al., "Natural Signal Classification by Neural Cliques and Phase-Locked Attractors", International Conference of the IEEE Engineering in Medicine and Biology Society, 2006, pp. 6693-6697.

Lin et al., "Robust digital signature for multimedia authentication", IEEE Circuits and Systems Magazine, vol. 3, No. 4, 2003, pp. 23-26.

Zang et al., "A New Multimedia Message Customizing Framework for mobile Devices", IEEE International Conference on Multimedia and Expo, 2007, pp. 1043-1046.

Zhou et al., "Ensembling neural networks: Many could be better than all", Artificial Intelligence, vol. 137, 2002, pp. 239-263.

Zhou et al., "Medical diagnosis with C4.5 rule preceded by artificial neural network ensemble", IEEE Transactions on Information Technology in Biomedicine, vol. 7, No. 1, Mar. 2003, pp. 37-42.

Zhu et al., "Technology-Assisted Dietary Assessment", SPIE. 6814. 681411, 2008, p. 1.

Zou et al., "A content-based image authentication system with lossless data hiding", International Conference on Multimedia and Expo. ICME, 2003, pp. II(213)-II(216).

(56) References Cited

OTHER PUBLICATIONS

Akira et al., "Columbia University's Baseline Detectors for 374 LSCOM Semantic Visual Concepts", Columbia University ADVENT Technical Report #222-2006-8, Mar. 20, 2007, pp. 17.
Amparo et al., "Real Time Speaker Localization and Detection System for Camera Steering in Multiparticipant Videoconferencing Environments", IEEE International Conference on Acoustics, Speech and Signal Processing 2011,pp. 2592-2595.
Boari et al., "Adaptive Routing for Dynamic Applications in Massively Parallel Architectures", IEEE Parallel & Distributed Technology: Systems & Applications (vol. 3, Issue: 1, Spring 1995), pp. 61-74.
Boyer et al., "A Crossover Operator for Evolutionary Algorithms Based on Population Features", Journal of Artificial Intelligence Research vol. 24 (2005) pp. 1-48.
Brecheisen et al., ""Hierarchical Genre Classification for Large Music Collections"" , IEEE International Conference on Multimedia and Expo (ICME) 2006, pp. 1385-1388.
Burgsteiner et al., "Movement prediction from real-world images using a liquid state machine" ,International Conference on Industrial, Engineering and Other Applications of Applied Intelligent Systems IEA/AIE 2005: Innovations in Applied Artificial Intelligence, pp. 121-130.
Cernansky et al., "Feed-forward echo state networks", IEEE International Joint Conference on Neural Networks, 2005, vol. 3, pp. 1479-1482.
Chang et al., "VideoQ: a fully automated video retrieval system using motion sketches" , Fourth IEEE Workshop on Applications of Computer Vision. WACV'98 (Cat. No. 98EX201), Oct. 19-21, 1998, pp. 270-271.
Cho et al.,"Efficient Motion-Vector-Based Video Search Using Query by Clip", IEEE International Conference on Multimedia and Expo (ICME) (IEEE Cat. No. 04TH8763), Year: 2004, vol. 2, pp. 1027-1030.
Clement et al."Speaker diarization of heterogeneous web video files: A preliminary study", IEEE International Conference on Acoustics, Speech and Signal Processing (ICASSP), May 22-27, 2011 pp. 4432-4435.
Cococcioni et al., "Automatic diagnosis of defects of rolling element bearings based on computational intelligence techniques", Ninth International Conference on Intelligent Systems Design and Applications, Nov.30-Dec. 2, 2009, pp. 970-975.
Emami et al., "Role of Spatiotemporal Oriented Energy Features for Robust Visual Tracking in Video Surveillance", IEEE Ninth International Conference on Advanced Video and Signal-Based Surveillance Sep. 18-21, 2012, pp. 349-354.
Fathy et al., "A parallel design and implementation for backpropagation neural network using MIMD architecture", 8th Mediterranean Electrotechnical Conference on Industrial Applications in Power Systems, Computer Science and Telecommunications (MELECON 96) ,May 16, 1996,1472-1476.
Foote et al.,"Content-based retrieval of music and audio", Multimedia Storage and Archiving Systems II, Published in SPIE Proceedings vol. 3229, Oct. 6, 1997, p. 1.
Freisleben et al., "Recognition of fractal images using a neural network",New Trends in Neural Computation, International Workshop on Artificial Neural Networks, IWANN '93 Sitges, Spain, Jun. 9-11, 1993: , pp. 632-637.
Ivan Garcia, "Solving the Weighted Region Least Cost Path Problem Using Transputers", Naval Postgraduate School Monterey, California ,1989 pp. 73.
Gomes et al., "Audio Watermarking and Fingerprinting: For Which Applications?", Journal of New Music Research 32(1) Mar. 2003 p. 1.
Gong et al., "A Knowledge-Based Mediator for Dynamic Integration of Heterogeneous Multimedia Information Sources", International Symposium on Intelligent Multimedia, Video and Speech Processing, Oct. 20-22, 2004, pp. 467-470.
Guo et al., "AdOn: An Intelligent Overlay Video Advertising System", https://doi.org/10.1145/1571941.1572049, Jul. 2009, pp. 628-629.
Howlett et al., "A Multi-Computer Neural Network Architecture in a Virtual Sensor System Application", International Journal of Knowledge-Based and Intelligent Engineering Systems, vol. 4, Published-Apr. 2000 pp. 86-93.
Hua et al., "Robust Video Signature Based on Ordinal Measure", International Conference on Image Processing ICIP '04. 2004, Oct. 24-27, 2004, pp. 5.
Iwamoto et al, "Image Signature Robust to Caption Superimposition for Video Sequence Identification", 2006 International Conference on Image Processing ,IEEE, Atlanta, GA, Oct. 8-11, 2006, pp. 3185-3188.
Herbert Jaeger, "the"echo state" approach to analysing and training recurrent neural networks", Bonn, Germany: German National Research Center for Information Technology GMD Technical Report, 148 ,2001, pp. 43.
Jianping Fan et al., "Concept-Oriented Indexing of Video Databases: Toward Semantic Sensitive Retrieval and Browsing", IEEE Transactions on Image Processing, vol. 13, No. 7, Jul. 2004, p. 1.
John L. Johnson., Pulse-coupled neural nets: translation, rotation, scale, distortion, and intensity signal invariance for images, vol. 33, No. 26, Applied Optics, Sep. 10, 1994, pp. 6239-6253.
Odinaev et al., "Cliques in Neural Ensembles as Perception Carriers", 2006 International Joint Conference on Neural Networks Sheraton Vancouver Wail Centre Hotel, Vancouver, BC, Canada Jul. 16-21, 2006, pp. 285-292.
Kabary et al., "SportSense: Using Motion Queries to Find Scenes in Sports Videos", DOI: 10.1145/2505515.2508211, Oct. 2013, pp. 2489-2491.
Keiji Yanai., "Generic Image Classification Using Visual Knowledge on the Web", DOI: 10.1145/957013.957047, Jan. 2003, pp. 167-176.
Lau et al., "Semantic Web Service Adaptation Model for a Pervasive Learning Scenario", Proceedings of the 2008 IEEE Conference on innovative Technologies in Intelligent Systems and Industrial Applications Multimedia University, Cyberjaya, Malaysia. Jul. 12-13, 2008, pp. 98-103.
Li et al., "Matching Commercial Clips from TV Streams Using a Unique, Robust and Compact Signature", DOI: 10.1109/DICTA. 2005.52, Jan. 2006, pp. 7.
Lin et al., "Generating Robust Digital Signature for Image/Video Authentication", Multimedia and Security Workshop at ACM Multimedia '98. Bristol. U.K., Sep. 1998, pp. 49-54.
Löytynoja et al., "Audio Encryption Using Fragile Watermarking", DOI: 10.1109/ICICS.2005.1689175, Jul. 2015, pp. 881-885.
Richard F. Lyon., "Computational Models of Neural Auditory Processing", DOI: 10.1109/ICASSP.1984.1172756, ICASSP '84. IEEE International Conference on Acoustics, Speech, and Signal Processing, Jan. 29, 2003, pp. 5.
Maass et al., "Computational Models for Generic Cortical Microcircuits", DOI: 10.1201/9780203494462.ch18, Jun. 10, 2003, pp. 1-26.
Mandhaoui et al., "Emotional speech characterization based on multi-features fusion for face-to-face interaction", 2009 International conference on signals, circuits and systems ,DOI: 10.1109/ICSCS.2009.5412691, Dec. 2009, pp. 1-6.
May et al., "The Transputer", Neural Computers. Springer Study Edition, vol. 41. Springer, Berlin, Heidelberg, DOI: 10.1007/978-3-642-83740-1_48, Jan. 1989 pp. 477-486.
McNamara et al., "Diversity Decay in Opportunistic Content Sharing Systems", DOI: 10.1109/WoWMoM.2011.5986211 2011 IEEE International Symposium on a World of Wireless, Mobile and Multimedia Networks Aug. 15, 2011, pp. 1-3.
Mei et al., "Contextual in-image Advertising",MM'OS, Oct. 26-31, 2008. Vancouver, British Columbia, Canada. Copyright 2008 ACM 978-1-60558-303-7/08/10, DOI: 10.1145/1459359.1459418•Source: DBLP, Jan. 2008, pp. 439-448.
Mei et al., "VideoSense—Towards Effective Online Video Advertising", MM'07, Sep. 23-28, 2007, Augsburg, Bavaria, Germany. Copyright 2007 ACM 978-1-59593-701-8/07/0009 . . . $5.00, Jan. 2007, pp. 1075-1084.

(56) References Cited

OTHER PUBLICATIONS

Mladenovic et al., "Electronic Tour Guide for Android Mobile Platform with Multimedia Travel Book" 20th Telecommunications forum Telfor 2012, DOI: 10.1109/TELFOR.2012.6419494, Nov. 20-22, 2012, pp. 1460-1463.
Morad et al., "Performance, Power Efficiency and Scalability of Asymmetric Cluster Chip Multiprocessors", IEEE Computer Architecture Letters, vol. 5, 2006, DOI 10.1109/L-CA.2006.6, Jul. 5, 2006, pp. 4.
Nagy et al., "A Transputer Based, Flexible, Real-Time Control System for Robotic Manipulators", UKACC International Conference on Control '96, Conference Publication No. 427 © IEE 1996, Sep. 2-5, 1996, pp. 84-89.
Nam et al., "Audio-Visual Content-Based Violent Scene Characterization", Proceedings 1998 International Conference on Image Processing. ICIP98 (Cat. No. 98CB36269), DOI: 10.1109/ICIP. 1998.723496, pp. 353-357.
Natschlager et al., "The "Liquid Computer": A Novel Strategy for Real-Time Computing on Time Series", Jan. 2002, pp. 1-7.
Nouza et al., "Large-Scale Processing, Indexing and Search System for Czech Audio-Visual Cultural Heritage Archives", DOI: 10.1109/MMSP.2012.6343465, Sep. 2012, pp. 337-342.
Odinaev., "Cliques to Neural Ensembles as Perception Carriers", 2006 International Joint Conference on Neural Networks Sheraton Vancouver Wail Centre Hotel, Vancouver, BC, Canada, DOI: 10.1109/IJCNN.2006.246693, Jul. 16-21, 2006, pp. 285-292.
Park et al., "Compact Video Signatures for Near-Duplicate Detection on Mobile Devices", DOI: 10.1109/ISCE.2014.6884293, Jun. 2014, pp. 1-2.
Maria Paula Queluz., "Content-based integrity protection of digital images", San Jose. California •Jan. 1999 SPIE vol. 3657.0277-786X/99/$10.00, DOI: 10.1117/12.344706, Apr. 1999, pp. 85-93.
Raichelgauz et al., "Co-evoletiooary Learning in Liquid Architectures", DOI: 10.1007/11494669_30, Jun. 2005, pp. 241-248.
Ribert et al., "An Incremental Hierarchical Clustering", Vision Interface '99, Trois-Rivieres, Canada, May 19-21, pp. 586-591.
Zhou et al, "Ensembling neural networks: Many could be better than all", National Laboratory for Novel Software Technology, Nanjing University, Hankou Road 22, Nanjing 210093, PR China Received Nov. 16, 2001, Available online Mar. 12, 2002, pp. 239-263.
Zhou et al, "Medical Diagnosis With C4.5 Rule Preceded by Artificial Neural Network Ensemble", IEEE Transactions on Information Technology in Biomedicine, vol. 7, Issue: 1, Mar. 2003, pp. 37-42.
Zhu et al., "Technology-Assisted Dietary Assesment", Proc SPIE. Mar. 20, 2008, pp. 1-15.
Zou et al., "A Content-Based Image Authentication System with Lossless Data Hiding", ICME 2003, pp. 213-216.
"Computer Vision Demonstration Website", Electronics and Computer Science, University of Southampton, 2005, USA.
Big Bang Theory Series 04 Episode 12, aired Jan. 6, 2011; [retrieved from Internet: ].
Boari et al, "Adaptive Routing for Dynamic Applications in Massively Parallel Architectures", 1995 IEEE, Spring 1995, pp. 1-14.
Burgsteiner et al., "Movement Prediction from Real-World Images Using a Liquid State machine", Innovations in Applied Artificial Intelligence Lecture Notes in Computer Science, Lecture Notes in Artificial Intelligence, LNCS, Springer-Verlag, BE, vol. 3533, Jun. 2005, pp. 121-130.
Cernansky et al, "Feed-forward Echo State Networks", Proceedings of International Joint Conference on Neural Networks, Montreal, Canada, Jul. 31-Aug. 4, 2005, pp. 1-4.
Chinchor, Nancy A. et al.; Multimedia Analysis + Visual Analytics = Multimedia Analytics; IEEE Computer Society; 2010; pp. 52-60. (Year: 2010).
Fathy et al, "A Parallel Design and Implementation for Backpropagation Neural Network Using MIMD Architecture", 3th Mediterranean Electrotechnical Conference, 19'96. MELECON '96, Date of Conference: May 13-16, 1996, vol. 3 pp. 1472-1475, vol. 3.

Freisleben et al, "Recognition of Fractal Images Using a Neural Network", Lecture Notes in Computer Science, 1993, vol. 6861, 1993, pp. 631-637.
Garcia, "Solving the Weighted Region Least Cost Path Problem Using Transputers", Naval Postgraduate School, Monterey, California, Dec. 1989.
Guo et al, AdOn: An Intelligent Overlay Video Advertising System (Year: 2009).
Hogue, "Tree Pattern Inference and Matching for Wrapper Induction on the World Wide Web", Master's Thesis, Massachusetts Institute of Technology, Jun. 2004, pp. 1-106.
Howlett et al, "A Multi-Computer Neural Network Architecture in a Virtual Sensor System Application", International journal of knowledge-based intelligent engineering systems, 4 (2). pp. 86-93, 133N 1327-2314.
Hua et al., "Robust Video Signature Based on Ordinal Measure", Image Processing, 2004, 2004 International conference on Image Processing (ICIP), vol. 1, IEEE, pp. 685-688, 2004.
International Search Report and Written Opinion for PCT/US2016/050471, ISA/RU, Moscow, RU, dated May 4, 2017.
International Search Report and Written Opinion for PCT/US2016/054634, ISA/RU, Moscow, RU, dated Mar. 16, 2017.
International Search Report and Written Opinion for PCT/US2017/015831, ISA/RU, Moscow, RU, dated Apr. 20, 2017.
Johnson et al, "Pulse-Coupled Neural Nets: Translation, Rotation, Scale, Distortion, and Intensity Signal Invariance for Images", Applied Optics, vol. 33, No. 26, 1994, pp. 6239-6253.
Lau et al., "Semantic Web Service Adaptation Model for a Pervasive Learning Scenario", 2008 IEEE Conference on Innovative Technologies in Intelligent Systems and Industrial Applications, 2008, pp. 98-103.
Li et al ("Matching Commercial Clips from TV Streams Using a Unique, Robust and Compact Signature" 2005) (Year: 2005).
Lin et al., "Generating robust digital signature for image/video authentication", Multimedia and Security Workshop at ACM Multimedia '98, Bristol, U.K., Sep. 1998, pp. 245-251.
Lu et al, "Structural Digital Signature for Image Authentication: An Incidental Distortion Resistant Scheme", IEEE Transactions on Multimedia, vol. 5, No. 2, Jun. 2003, pp. 161-173.
Lyon, "Computational Models of Neural Auditory Processing", IEEE International Conference on Acoustics, Speech, and Signal Processing, ICASSP '84, Date of Conference: Mar. 1984, vol. 9, pp. 41-44.
Ma Et El "Semantics modeling based image retrieval system using neural networks", 2005.
Marian Stewart B et al., "Independent component representations for face recognition", Proceedings of the SPIE Symposium on Electronic Imaging: Science and Technology; Conference on Human Vision and Electronic Imaging III, San Jose, California, Jan. 1998, pp. 1-12.
May et al, "The Transputer", Springer-Verlag Berlin Heidelberg 1989, vol. 41.
McNamara et al., "Diversity Decay in opportunistic Content Sharing Systems", 2011 IEEE International Symposium on a World of Wireless, Mobile and Multimedia Networks, pp. 1-3.
Morad et al., "Performance, Power Efficiency and Scalability of Asymmetric Cluster Chip Multiprocessors", Computer Architecture Letters, vol. 4, Jul. 4, 2005, pp. 1-4, XP002466254.
Nagy et al, "A Transputer, Based, Flexible, Real-Time Control System for Robotic Manipulators", UKACC International Conference on Control '96, Sep. 2-5, 1996, Conference Publication No. 427, IEE 1996.
Natschlager et al., "The "Liquid Computer": A novel strategy for real-time computing on time series", Special Issue on Foundations of Information Processing of telematik, vol. 8, No. 1, 2002, pp. 39-43, XP002466253.
Odinaev et al, "Cliques in Neural Ensembles as Perception Carriers", Technion—Institute of Technology, 2006 International Joint Conference on neural Networks, Canada, 2006, pp. 285-292.
Ortiz-Boyer et al, "CIXL2: A Crossover Operator for Evolutionary Algorithms Based on Population Features", Journal of Artificial Intelligence Research 24 (2005) Submitted Nov. 2004; published 07105, pp. 1-48.

(56) References Cited

OTHER PUBLICATIONS

Pandya etal. A Survey on QR Codes: in context of Research and Application. International Journal of Emerging Technology and U Advanced Engineering. ISSN 2250-2459, ISO 9001:2008 Certified Journal, vol. 4, Issue 3, Mar. 2014 (Year: 2014).

Queluz, "Content-Based Integrity Protection of Digital Images", SPIE Conf. on Security and Watermarking of Multimedia Contents, San Jose, Jan. 1999, pp. 85-93.

Rui, Yong et al. "Relevance feedback: a power tool for interactive content-based image retrieval." IEEE Transactions on circuits and systems for video technology 8.5 (1998): 644-655.

Santos et al., "SCORM-MPEG: An Ontology of Interoperable Metadata for multimediaand E-Learning", 23rd International Conference on Software, Telecommunications and Computer Networks (SoftCom), 2015, pp. 224-228.

Scheper et al, "Nonlinear dynamics in neural computation", ESANN'2006 proceedings—European Symposium on Artificial Neural Networks, Bruges (Belgium), Apr. 26-28, 2006, d-side publication, ISBN 2-930307-06-4, pp. 1-12.

Schneider et al, "A Robust Content based Digital Signature for Image Authentication", Proc. ICIP 1996, Lausane, Switzerland, Oct. 1996, pp. 227-230.

Srihari et al., "Intelligent Indexing and Semantic Retrieval of Multimodal Documents", Kluwer Academic Publishers, May 2000, vol. 2, Issue 2-3, pp. 245-275.

Srihari, Rohini K. "Automatic indexing and content-based retrieval of captioned images" Computer 0 (1995): 49-56.

Stolberg et al ("HIBRID-SOC: A Multi-Core SOC Architecture for Multimedia Signal Processing" 2003).

Stolberg et al, "HIBRID-SOC: A Mul Ti-Core SOC Architecture for Mul Timedia Signal Processing", 2003 IEEE, pp. 189-194.

Theodoropoulos et al, "Simulating Asynchronous Architectures on Transputer Networks", Proceedings of the Fourth Euromicro Workshop on Parallel and Distributed Processing, 1996. PDP '96, pp. 274-281.

Vallet et al ("Personalized Content Retrieval in Context Using Ontological Knowledge" Mar. 2007) (Year: 2007).

Verstraeten et al, "Isolated word recognition with the Liquid State Machine: a case study", Department of Electronics and Information Systems, Ghent University, Sint-Pietersnieuwstraat 41, 9000 Gent, Belgium, Available onlline Jul. 14, 2005, pp. 521-528.

Wang et al., "Classifying Objectionable Websites Based onImage Content", Stanford University, pp. 1-12.

Ware et al, "Locating and Identifying Components in a Robot's Workspace using a Hybrid Computer Architecture" Proceedings of the 1995 IEEE International Symposium on Intelligent Control, Aug. 27-29, 1995, pp. 139-144.

Whitby-Strevens, "The transputer", 1985 IEEE, pp. 292-300.

Wilk et al., "The Potential of Social-Aware Multimedia Prefetching on Mobile Devices", International Conference and Workshops on networked Systems (NetSys), 2015, pp. 1-5.

Yanagawa et al, "Columbia University's Baseline Detectors for 374 LSCOM Semantic Visual Concepts", Columbia University Advent Technical Report # 222-2006-8, Mar. 20, 2007, pp. 1-17.

Yanagawa et al., "Columbia University's Baseline Detectors for 374 LSCOM Semantic Visual Concepts", Columbia University ADVENT Technical Report #222, 2007, pp. 2006-2008.

* cited by examiner

CROWD SEPARATION

BACKGROUND

Crowd separation may include identifying different pedestrians in a crowd of pedestrians. Said identifying allows to predict the movement of the different pedestrians and to enable safer autonomous or safer semi-autonomous driving in the presence of a crowd of pedestrians.

It has been found that neural networks trained as regressors fail to perform crowd separation.

There is a growing need to provide efficient and accurate crowd separation.

SUMMARY

There may be provided a method for crowd separation, the method may include (a) receiving or generating a signature of an image of a first plurality of pedestrians, wherein the image may include regions, wherein the signature of the image may include descriptors of the regions, wherein each descriptor of a region may be associated with a region and may include a set of identifiers that identify content included in the region and in a vicinity of the region; (b) detecting, within the descriptors of the regions, unique combinations of identifiers that may be indicative of spatial relationships between the regions and bounding boxes that surround pedestrians of the first plurality of pedestrians; wherein the unique combinations may be learnt during a supervised machine learning process that may be fed with test images of densely positioned pedestrians; and (c) locating the pedestrians of the first plurality of pedestrians based, at least in part, on the spatial relationships related to detected unique combinations and to locations of the regions.

The method may include ignoring unique combinations of identifiers that have less than a predefined number of identifiers.

The locating of the pedestrians of the first plurality of pedestrians may include locating the bounding boxes and locating the pedestrians within the bounding boxes.

The method may include distinguishing between the pedestrians of the first plurality of pedestrians.

The method may include receiving or generating signatures of a group of images of the first plurality of pedestrians that were acquired at different points of time and estimating movement patterns for at least some of the pedestrians of the first plurality of pedestrians.

The different test images may represent pedestrians at different spatial relationships from one or more regions of the test images.

The method may include performing the supervised machine learning process.

The performing of the supervised machine learning process may include learning unique combination that appear in regions that belong to a bounding box and learning unique combinations that appear in regions that may be located outside the bounding boxes.

There may be provided a non-transitory computer readable medium that may store instructions for: (a) receiving or generating a signature of an image of a first plurality of pedestrians, wherein the image may include regions, wherein the signature of the image may include descriptors of the regions, wherein each descriptor of a region may be associated with a region and may include a set of identifiers that identify content included in the region and in a vicinity of the region; (b) detecting, within the descriptors of the regions, unique combinations of identifiers that may be indicative of spatial relationships between the regions and bounding boxes that surround pedestrians of the first plurality of pedestrians; wherein the unique combinations may be learnt during a supervised machine learning process that may be fed with test images of densely positioned pedestrians; and (c) locating the pedestrians of the first plurality of pedestrians based, at least in part, on the spatial relationships related to detected unique combinations and to locations of the regions.

The non-transitory computer readable medium may store instructions for ignoring unique combinations of identifiers that have less than a predefined number of identifiers.

The locating of the pedestrians of the first plurality of pedestrians may include locating the bounding boxes and locating the pedestrians within the bounding boxes.

The non-transitory computer readable medium may store instructions for distinguishing between the pedestrians of the first plurality of pedestrians.

The non-transitory computer readable medium may store instructions for receiving or generating signatures of a group of images of the first plurality of pedestrians that were acquired at different points of time and estimating movement patterns for at least some of the pedestrians of the first plurality of pedestrians.

The different test images may represent pedestrians at different spatial relationships from one or more regions of the test images.

The non-transitory computer readable medium may store instructions for performing the supervised machine learning process.

The performing of the supervised machine learning process may include learning unique combination that appear in regions that belong to a bounding box and learning unique combinations that appear in regions that may be located outside the bounding boxes.

There may be provided a computerized system that may include one or more units (such as a processing circuit—for example a central processing unit, a graphic processing unit, a field programmable gate array, an ASIC, a neural network processor, one or more integrated circuits) configured to execute a method for crowd separation, by executing the steps of (a) receiving or generating a signature of an image of a first plurality of pedestrians, wherein the image may include regions, wherein the signature of the image may include descriptors of the regions, wherein each descriptor of a region may be associated with a region and may include a set of identifiers that identify content included in the region and in a vicinity of the region; (b) detecting, within the descriptors of the regions, unique combinations of identifiers that may be indicative of spatial relationships between the regions and bounding boxes that surround pedestrians of the first plurality of pedestrians; wherein the unique combinations may be learnt during a supervised machine learning process that may be fed with test images of densely positioned pedestrians; and (c) locating the pedestrians of the first plurality of pedestrians based, at least in part, on the spatial relationships related to detected unique combinations and to locations of the regions.

BRIEF DESCRIPTION OF THE DRAWINGS

The embodiments of the disclosure will be understood and appreciated more fully from the following detailed description, taken in conjunction with the drawings in which.

DESCRIPTION OF EXAMPLE EMBODIMENTS

Figure 1:
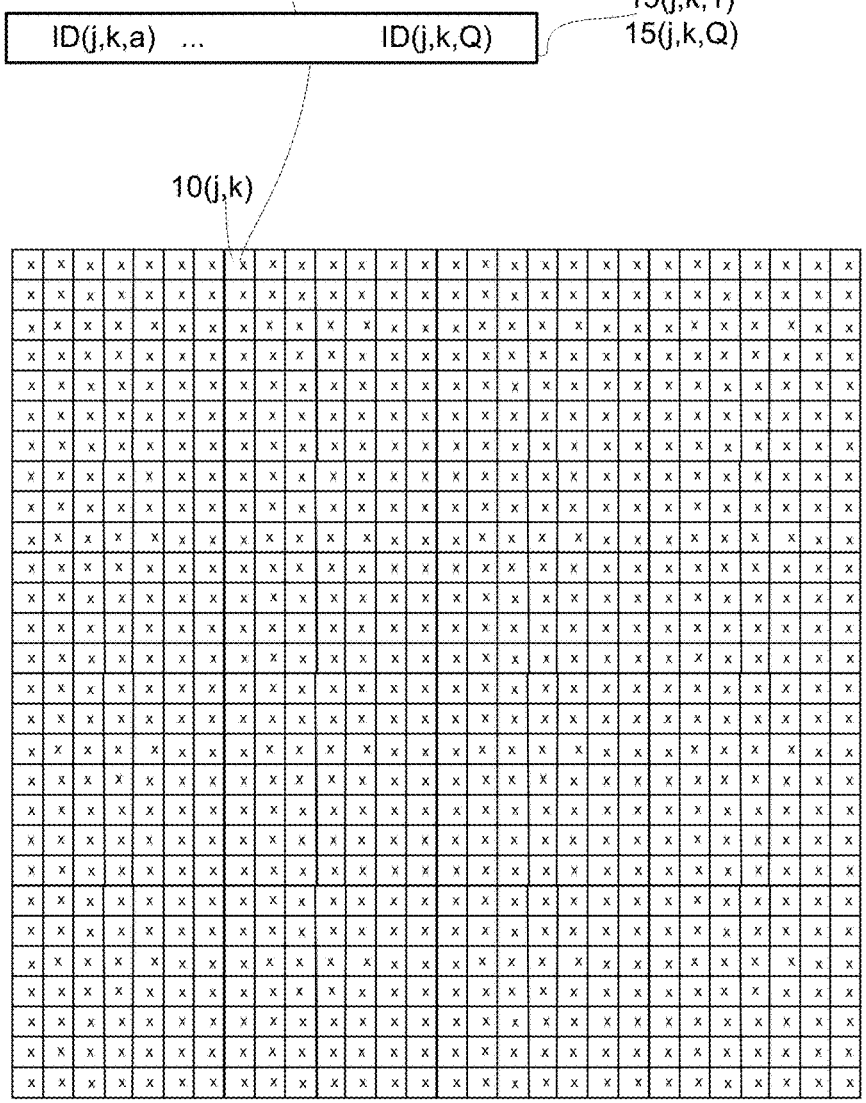
FIG. 1 illustrates an example of a test image, regions of the test image and a descriptor of one of the regions of the test image.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the figures, any part of the specification and/or any claims may be provided.

There may be provided a system, method and computer readable medium (the medium is non-transitory) for crowd separation. The system may be a computerized system that may include a memory, an input and a processor that in turn may include one or more processing circuits. The memory may be a volatile or no volatile memory, the input may include a sensor or may be fed by sensed information.

A processing circuit may be one or more integrated circuits, may be included in an integrated circuit, may be a graphic processing unit, a central processing unit, a hardware accelerator, an image processor, a digital signal processor, and the like.

FIG. 1 illustrates test image 10 that includes test image regions 10(j,k). Index j is a row index (may range between 1 and J) and index k is a column index (may range between 1 and K). Both indexes are positive integers.

Each region has a center and has a descriptor of a region. A descriptor of each region (for example RI(j,k) 16(j,k)) includes a set of identifiers (for example Q identifiers ID(j,k,1) till ID(j,k,Q) 15(j,k,1) till 15(j,k,Q).).

A signature of test image 10 (SI 17) includes the descriptors of the regions of the test image.

Non-limiting examples of generating test image signatures that include indexes are illustrated for example in U.S. patent application Ser. No. 16/542,327 and in U.S. Pat. Nos. 8,326,775 and 8,312,031, all being incorporated herein by reference.

Figure 2:
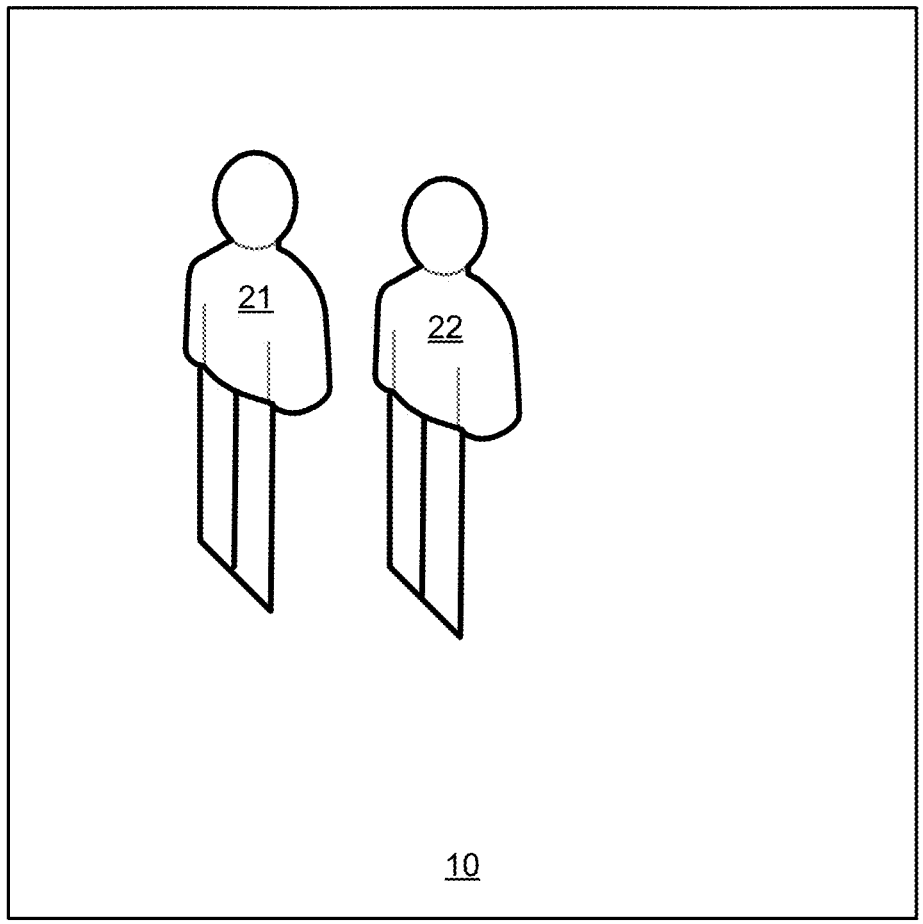
FIG. 2 illustrates an example of a test image of a pair of pedestrians.

FIG. 2 illustrates an example of an test image 10 of a pair of pedestrians 21 and 22. These pedestrians are proximate to each other and may be identified by a neural network operating as a regressor as a single pedestrian.

Figure 3:
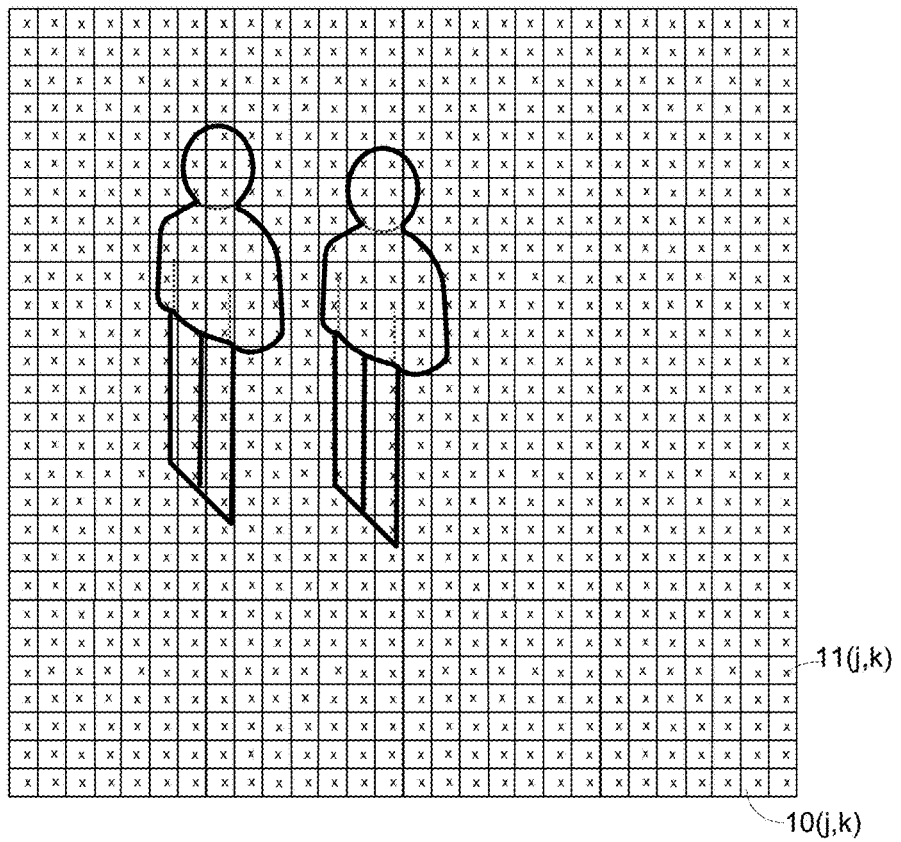
FIG. 3 illustrates an example of a test image of a pair of pedestrians, regions of the test image and centers of the regions of the test image.

FIG. 3 illustrates an example of test image 10 of the pair of pedestrians 21 and 22, regions ($10(j,k)$) of the test image 10 and centers (also referred to as keypoints) $10(j.k)$ of the regions of the test image.

Figure 4:
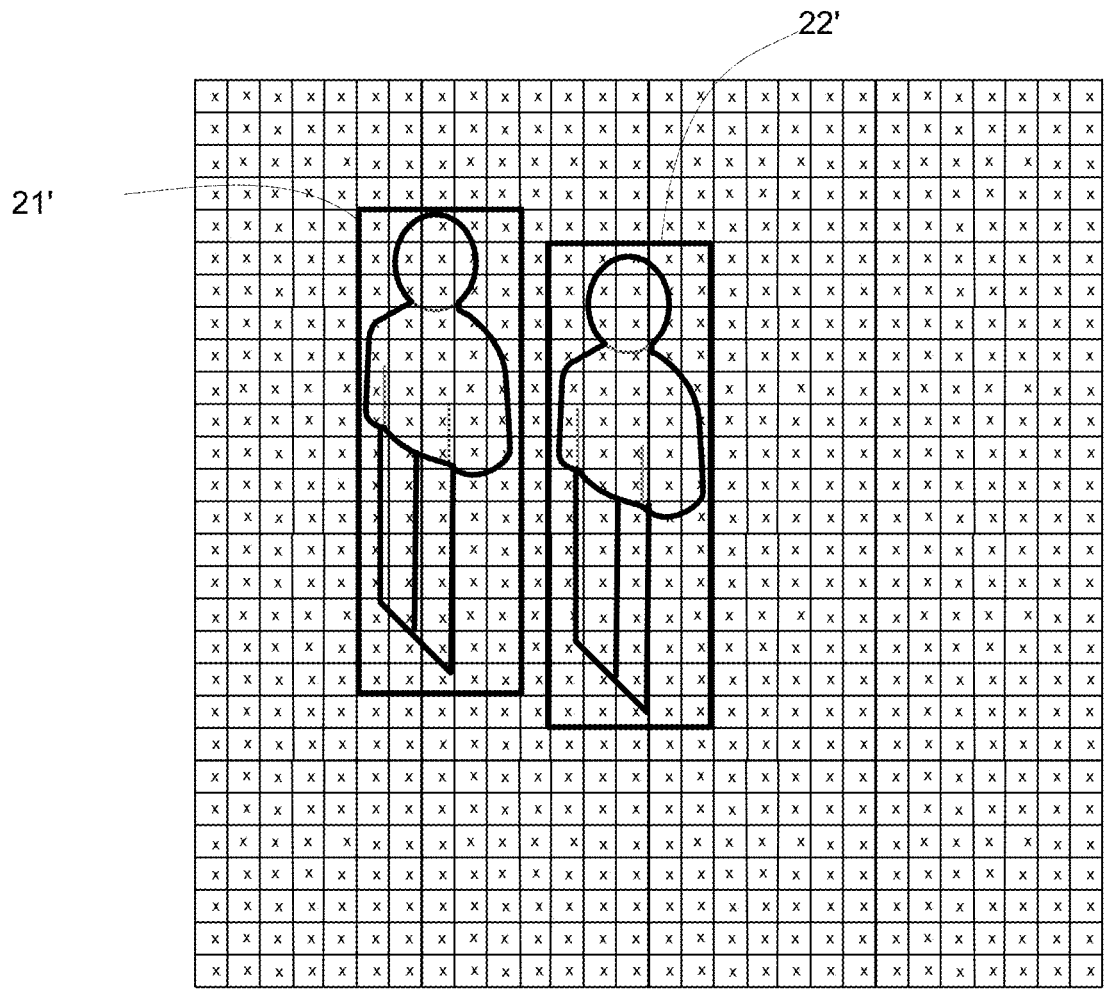
FIG. 4 illustrates an example of a test image of a pair of pedestrians, bounding boxes that surround the pedestrians, regions of the test image and centers of the regions of the test image.

FIG. 4 illustrates an example of test image 10 of the pair of pedestrians 21 and 22, bounding boxes 21' and 22' that surround the pedestrians 21 and 22 respectively, regions 10(x,y) of the test image and centers 11(x,y) of the regions of the test image.

Figure 5:
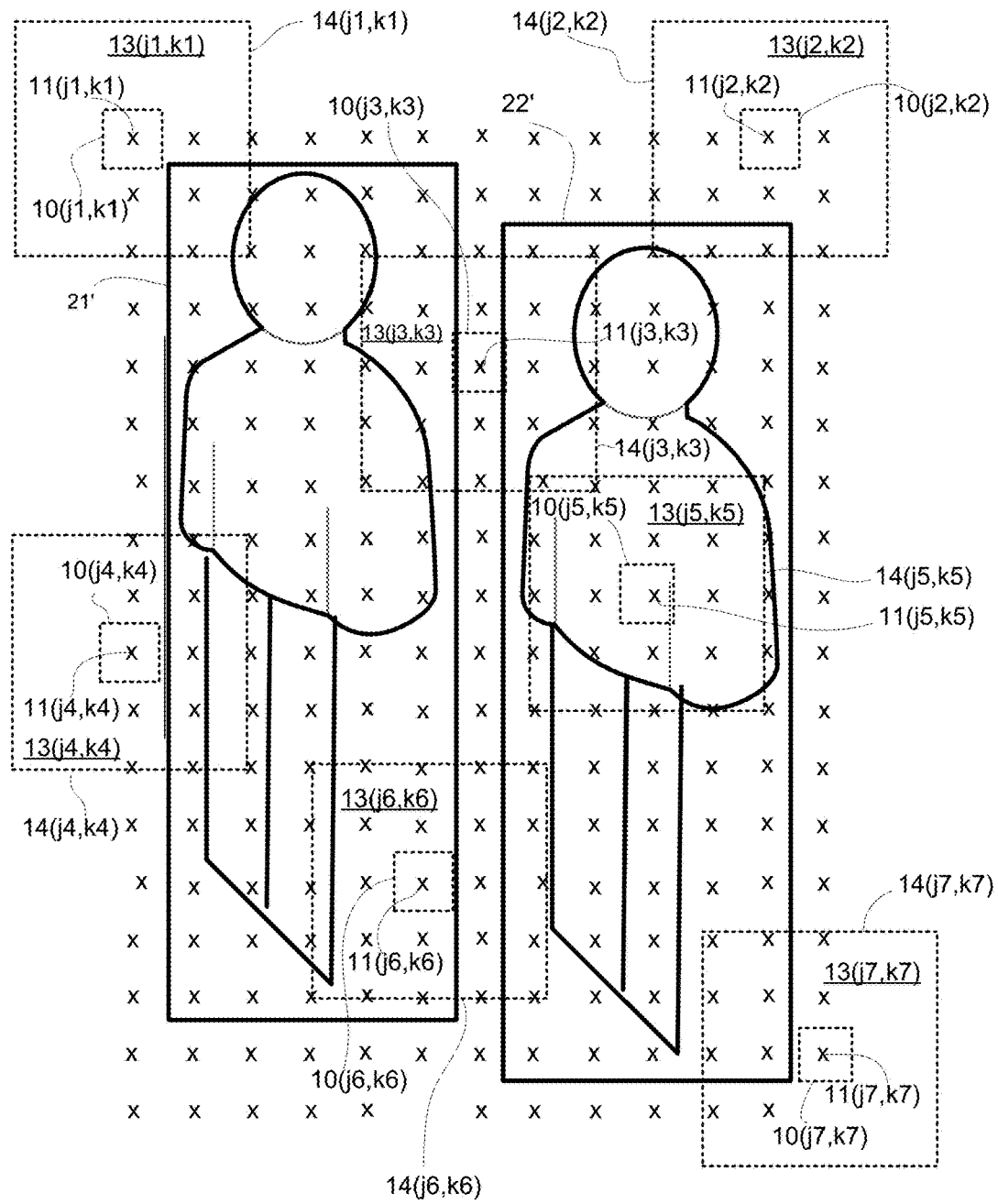
FIG. 5 illustrates an example of a test image of a pair of pedestrians, bounding boxes that surround the pedestrians, regions of the test image, vicinities of some of the regions, some areas that include some of the regions and their vicinities, and centers of the regions of the test image.

FIG. 5 illustrates an example of test image 10 of a pair of pedestrians 21 and 22, bounding boxes 21' and 22' that surround the pedestrians, regions 10(x,y) of the test image 10, vicinities (first till seventh vicinities 13(j1,k1)-13(j7,k7)) of some of the regions (first till seventh regions 10(j1,k1)-10(j7,k7)), some areas (first till seventh areas 14(j1,k1)-14(j7,k7)), that include some of the regions and their vicinities, and centers (first till seventh centers 11(j1,k1)-11(j7,k7)), of the some of the regions of the test image.

The first till seventh regions have different spatial relationships with the first and/or second bounding boxes:

First region 10(j1,k1) is located outside bounding boxes 21' and 22'. It is located above and to the left of the left upper edge of first bounding box 21'. A right lower portion of the first vicinity 13(j1,k1) overlaps a left upper portion of the first bounding box 21' and overlaps a portion of first pedestrian 21.

Second region 10(j2,k2) is located outside bounding boxes 21' and 22'. It is located above and to the right of the right upper edge of second bounding box 22'. A left lower portion of the second vicinity 13(j2,k2) overlaps a right upper portion of the second bounding box 22' and overlaps a portion of second pedestrian 22.

Third region 10(j2,k2) partially overlaps bounding boxes 21' and 22'. It is located between the first and second bounding boxes 22'. A left portion of the third vicinity 13(j3,k3) overlaps a right portion of the second bounding box 22', and overlaps a portion of second pedestrian 22. A right portion of the third vicinity 13(j3,k3) overlaps a left portion of the first bounding box 21', and overlaps a portion of first pedestrian 21.

Fourth region 10(j4,k4) is located outside bounding boxes 21' and 22'. It is located the left of the first bounding box 21'. A right portion of the fourth vicinity 13(j4,k4) overlaps a left portion of the first bounding box 21' and overlaps a portion of first pedestrian 21.

Fifth region 10(j5,k5) and fifth vicinity 13(j5,k4) are located inside the second bounding box 22' and overlap a portion of second pedestrian 22.

Sixth region 10(j5,k5) is located inside the first bounding box 21'. Different portions of sixth vicinity 13(j6,k6) overlap first bounding box 21', second bounding box 22' and first pedestrian 21.

Seventh region 10(j7,k7) is located outside bounding boxes 21' and 22'. It is located above and to the right of the right lower edge of second bounding box 22'. A left upper portion of the seventh vicinity 13(j7,k7) overlaps a right lower portion of the second bounding box 22'.

Test image 10 includes multiple other regions that exhibit different spatial relationships with first bounding box 21' second bounding box 22, first pedestrian 11 and second pedestrian 22.

During a supervised machine learning process test images (including test image 10) of pedestrians, their bounding boxes and their test image signatures are fed to a machine learning process in order to learn unique combinations of identifiers that appear in region descriptors. Different unique combinations may be indicative of different spatial relationships between the regions and bounding boxes that surround pedestrians.

See, for example:
Unique combinations of identifiers related to regions such as first region 10(j1,k1) may indicate that a pedestrian is located below and to the right of the regions.
Unique combinations of identifiers related to regions such as second region 10(j2,k2) may indicate that a pedestrian is located below and partially to the left of the regions.
Unique combinations of identifiers related to regions such as third region 10(j3,k3) may indicate that pedestrians are located at both sided (right and left) of the third region.
Unique combinations of identifiers related to regions such as fourth region 10(j4,k4) may indicate that a pedestrian is located to the right of the regions.
Unique combinations of identifiers related to regions such as fifth region 10(j5,k5) may indicate that the regions include a part of a pedestrian.
Unique combinations of identifiers related to regions such as sixth region 10(j6,k6) may indicate that a pedestrian is located to the left of the regions.
Unique combinations of identifiers related to regions such as seventh region 10(j7,k7) may indicate that a pedestrian is located partially above and to the right of the regions.

At the same manner—unique combination of identifiers may provide information regarding the spatial relationship between regions and bounding boxes, between vicinities of the regions and bounding boxes and/or between vicinities of the regions and pedestrians.

Unique combinations may provide indication about the exact or proximate distance between a center of a region and a certain point (or certain points) of a pedestrian. The certain points may be the center of the pedestrian, a closest point of the pedestrian to the center of the region—or any other point located anywhere on the pedestrian.

A unique combination may be regarding of being of significance (not to be ignored of) is the unique combination appears in at least a first number of regions and/or if the combination includes at least a second number of identifiers. The first and second numbers may be predefined, may be evaluated during the supervised machine learning, and the like. The first and second number may be determined using any manner—for example by trial and error.

Figure 6:
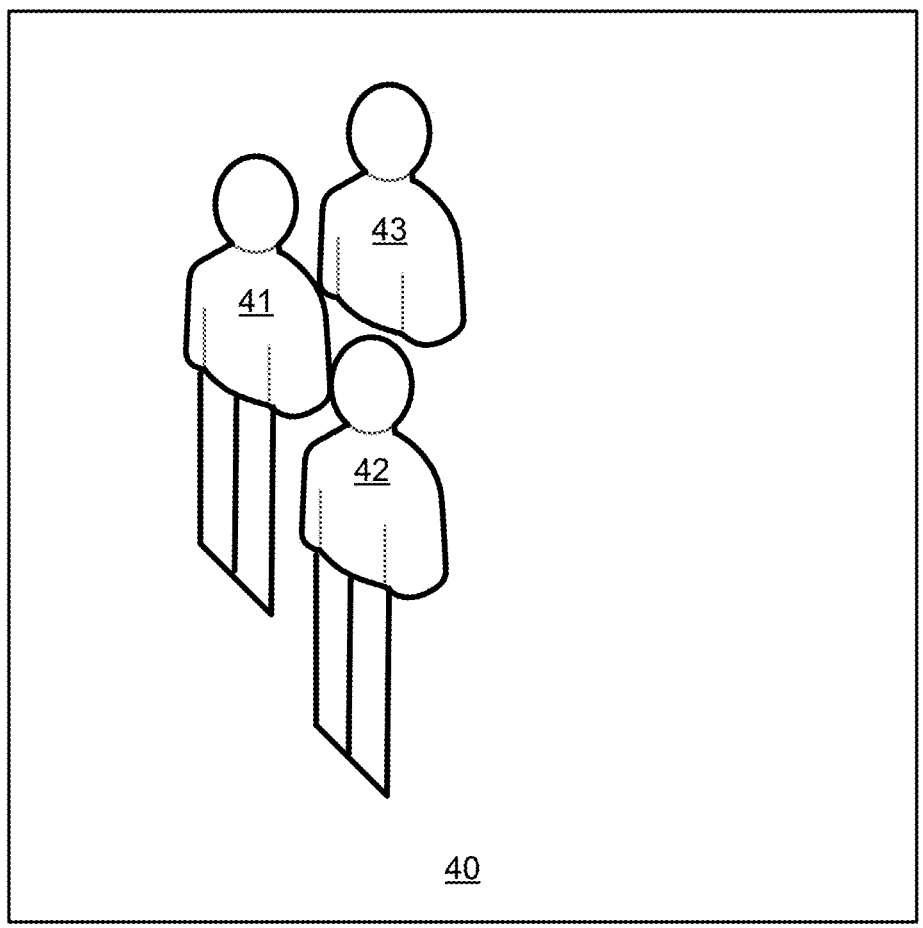
FIG. 6 illustrates an example of a test image of three pedestrians.
Figure 7:
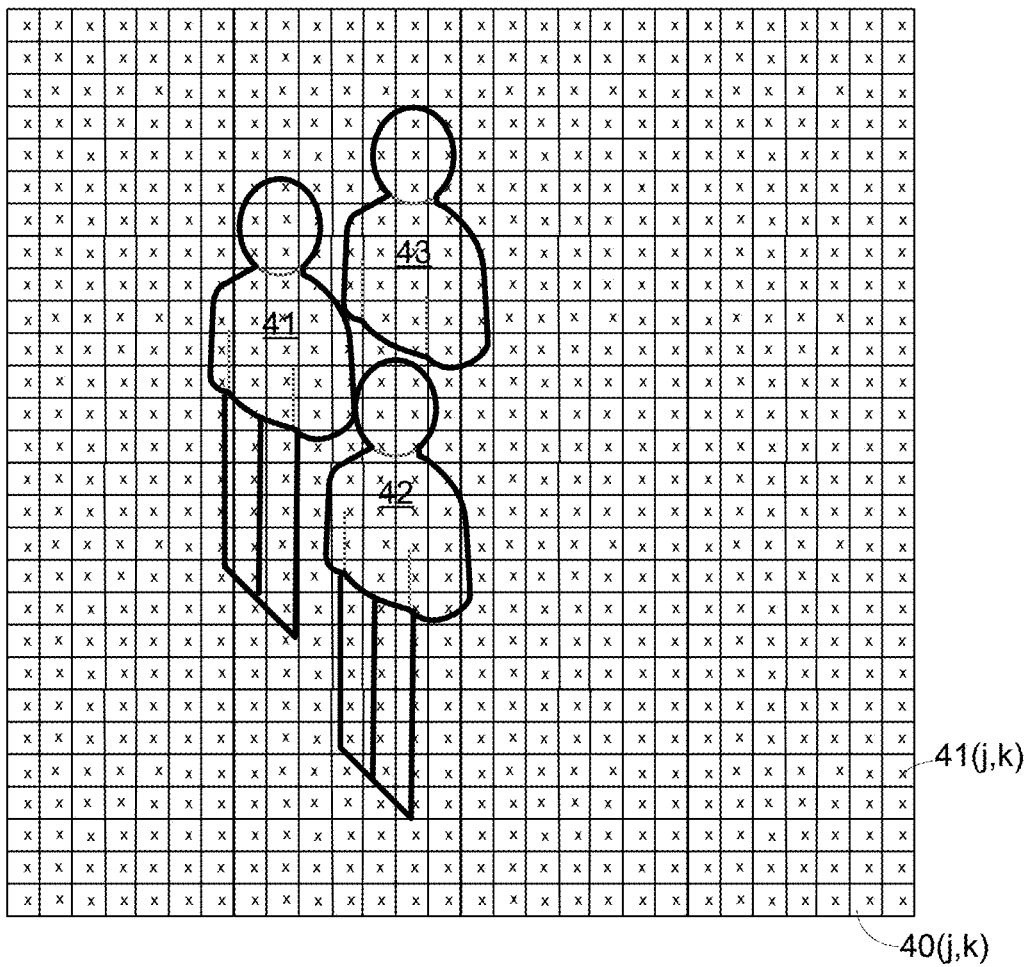
FIG. 7 illustrates an example of a test image of three pedestrians with regions and centers.

FIG. 6 illustrates an example of an image 40 of three pedestrians 41, 42 and 43. FIG. 7 illustrates image 40 of the three pedestrians with regions 40(j,k) associated with centers 41(j,k).

Image 40 is processed by generating or receiving a signature of image 40, that include descriptors of regions 40(j,k) associated with centers 41(j,k), searching for unique combinations of identifiers that will assist in identifying first till third pedestrians 41, 42 and 43. The unique combinations should include information regarding all the pedestrians located within vicinities of the regions.

Figure 8:
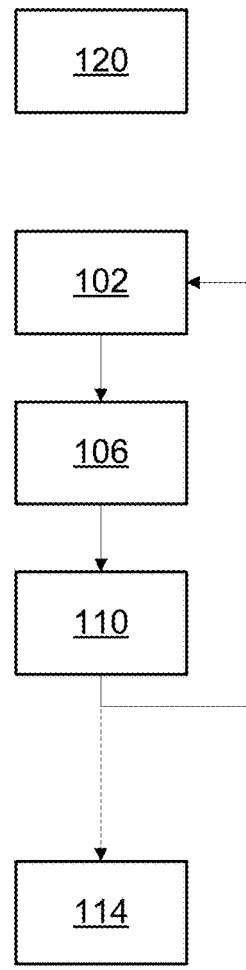
FIG. 8 illustrates an example of a method.

FIG. 8 is an example of method 100 for image separation.

Method 100 may start by step 102 of receiving or generating a signature of an image of the first plurality of pedestrians. The image includes regions. A signature of the image includes descriptors of the regions. Each descriptor of a region is associated with a region and comprises a set of identifiers that identify content included in the region and in a vicinity of the region.

Step 102 may be followed by step 106 of detecting, within the descriptors of the regions, unique combinations of identifiers that are indicative of spatial relationships between the regions and bounding boxes that surround pedestrians of the first plurality of pedestrians.

The unique combinations are learnt during a supervised machine learning process that is fed with test images of densely positioned pedestrians.

Step 106 may be followed by step 110 of locating the pedestrians of the first plurality of pedestrians based, at least in part, on the spatial relationships related to detected unique combinations and to locations of the regions.

Step 106 may include ignoring unique combinations of identifiers that have less than a second number of identifiers.

Step 106 may include (a) locating bounding boxes that surround the pedestrians and (b) locating the pedestrians within the bounding boxes.

Step 110 may include distinguishing between the pedestrians of the first plurality of pedestrians.

Steps 102, 106, and 110 may be repeated multiple times—for example on images of the first plurality of pedestrians acquired at different points of time. The outcome of the repetitions may be processed (step 114) to estimate movement patterns for at least some of the pedestrians of the first plurality of pedestrians.

Method 100 may include step 120 of performing the supervised machine learning process.

Step 120 may include processing different test images that represents pedestrians at different spatial relationships from one or more regions of the test images.

Step 120 may include learning unique combination that appear in regions that belong to a bounding box and learning unique combinations that appear in regions that are located outside the bounding boxes.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof

We claim:
1. A method for crowd separation, the method comprises:
receiving or generating a signature of an image of a first plurality of pedestrians, wherein the image comprises regions, wherein the signature of the image comprises descriptors of the regions, wherein each descriptor of a region is associated with a region and comprises a set of identifiers that identify content included in the region and in a vicinity of the region;
detecting, within the descriptors of the regions, unique combinations of identifiers that are indicative of spatial relationships between the regions and bounding boxes that surround pedestrians of the first plurality of pedestrians; wherein the unique combinations are learnt during a supervised machine learning process that is fed with test images of densely positioned pedestrians; and locating the pedestrians of the first plurality of pedestrians based, at least in part, on the spatial relationships related to detected unique combinations and to locations of the regions.

2. The method according to claim 1 comprising ignoring unique combinations of identifiers that have less than a predefined number of identifiers.

3. The method according to claim 1 wherein the locating of the pedestrians of the first plurality of pedestrians comprises locating the bounding boxes and locating the pedestrians within the bounding boxes.

4. The method according to claim 1 comprising distinguishing between the pedestrians of the first plurality of pedestrians.

5. The method according to claim 1 comprising receiving or generating signatures of a group of images of the first plurality of pedestrians that were acquired at different points of time and estimating movement patterns for at least some of the pedestrians of the first plurality of pedestrians.

6. The method according to claim 1 wherein different test images represents pedestrians at different spatial relationships from one or more regions of the test images.

7. The method according to claim 1 comprising performing the supervised machine learning process.

8. The method according to claim 7 wherein the performing of the supervised machine learning process comprises learning unique combination that appear in regions that belong to a bounding box and learning unique combinations that appear in regions that are located outside the bounding boxes.

9. A non-transitory computer readable medium that stores instructions for:
receiving or generating a signature of an image of a first plurality of pedestrians, wherein the image comprises regions, wherein the signature of the image comprises descriptors of the regions, wherein each descriptor of a region is associated with a region and comprises a set of identifiers that identify content included in the region and in a vicinity of the region;
detecting, within the descriptors of the regions, unique combinations of identifiers that are indicative of spatial relationships between the regions and bounding boxes that surround pedestrians of the first plurality of pedestrians; wherein the unique combinations are learnt during a supervised machine learning process that is fed with test images of densely positioned pedestrians; and
locating the pedestrians of the first plurality of pedestrians based, at least in part, on the spatial relationships related to detected unique combinations and to locations of the regions.

10. The non-transitory computer readable medium according to claim 9 that stores instructions for ignoring unique combinations of identifiers that have less than a predefined number of identifiers.

11. The non-transitory computer readable medium according to claim 9 wherein the locating of the pedestrians of the first plurality of pedestrians comprises locating the bounding boxes and locating the pedestrians within the bounding boxes.

12. The non-transitory computer readable medium according to claim 9 that stores instructions for distinguishing between the pedestrians of the first plurality of pedestrians.

13. The non-transitory computer readable medium according to claim 9 that stores instructions for receiving or generating signatures of a group of images of the first plurality of pedestrians that were acquired at different points of time and estimating movement patterns for at least some of the pedestrians of the first plurality of pedestrians.

14. The non-transitory computer readable medium according to claim 9 wherein different test images represents pedestrians at different spatial relationships from one or more regions of the test images.

15. The non-transitory computer readable medium according to claim 9 that stores instructions for performing the supervised machine learning process.

16. The non-transitory computer readable medium according to claim 15 wherein the performing of the supervised machine learning process comprises learning unique combination that appear in regions that belong to a bounding box and learning unique combinations that appear in regions that are located outside the bounding boxes.

17. A computerized system that comprises:
an input, a memory and a processor that comprises at least one processing circuits;
wherein the processor is configured to receive or generate a signature of an image of a first plurality of pedestrians, wherein the image may include regions, wherein the signature of the image may include descriptors of the regions, wherein each descriptor of a region may be associated with a region and may include a set of identifiers that identify content included in the region and in a vicinity of the region;
wherein the processor is configured to:
detect, within the descriptors of the regions, unique combinations of identifiers that may be indicative of spatial relationships between the regions and bounding boxes that surround pedestrians of the first plurality of pedestrians; wherein the unique combinations may be learnt during a supervised machine learning process that may be fed with test images of densely positioned pedestrians;
and locate the pedestrians of the first plurality of pedestrians based, at least in part, on the spatial relationships related to detected unique combinations and to locations of the regions.

18. The computerized system according to claim 17 wherein the input is configured to receive the signature of the image of the first plurality of pedestrians.

19. The computerized system according to claim 17 wherein the input is a sensor.

20. The computerized system according to claim 17 wherein the processor is configured to generate the signature of the image of the first plurality of pedestrians.

* * * * *